United States Patent
Sakata et al.

(10) Patent No.: US 6,818,674 B2
(45) Date of Patent: Nov. 16, 2004

(54) ELASTIC MEMBER AND IMAGE FORMATION EQUIPMENT

(75) Inventors: Junji Sakata, Tokyo (JP); Hirotaka Yamazaki, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 443 days.

(21) Appl. No.: 09/985,771

(22) Filed: Nov. 6, 2001

(65) Prior Publication Data

US 2002/0091170 A1 Jul. 11, 2002

(30) Foreign Application Priority Data

| Nov. 8, 2000 | (JP) | 2000-339883 |
| Dec. 21, 2000 | (JP) | 2000-388889 |

(51) Int. Cl.$^7$ ............................................. C08G 18/28
(52) U.S. Cl. ................. 521/110; 521/111; 521/112; 521/117; 521/122; 521/130; 521/159; 521/170; 521/174; 399/279; 399/313
(58) Field of Search ....................... 521/110, 111, 521/112, 117, 122, 130, 159, 170, 174; 399/279, 313

(56) References Cited

U.S. PATENT DOCUMENTS

| 4,347,330 A | * | 8/1982 | Demou et al. ............... 521/110 |
| 5,719,249 A | * | 2/1998 | Fujita et al. ............... 528/27 |
| 5,911,099 A | | 6/1999 | Nakajima et al. |
| 5,933,693 A | | 8/1999 | Sakata et al. |
| 5,985,948 A | * | 11/1999 | Burkhart et al. ............ 521/112 |
| 6,258,867 B1 | * | 7/2001 | Nodelman et al. .......... 521/137 |
| 6,376,567 B1 | * | 4/2002 | Werner et al. .............. 521/159 |

* cited by examiner

*Primary Examiner*—John M. Cooney, Jr.
(74) *Attorney, Agent, or Firm*—Oblon, Spivak, McClelland, Maier & Neustadt, P.C.

(57) ABSTRACT

There are disclosed an elastic member which comprises (A) polyurethane foam obtained by agitationally mixing a foaming agent, a foam stabiizer and a urethane prepolymer synthesized from a polyol and a polyisocyanate in the presence of a modified silicone, or (B) polyurethane foam obtained by agitationally mixing a polyol, a polyisocyanate, a modified silicone oil bearing a functional group reactive with a polyisocyanate, a foaming agent and a foam stabiizer comprising a polyether modified silicone containing 50 to 100% by weight of a polyoxyethylene unit in the polyether moiety; image formation equipment equipped with the above elastic member; and a toner supply roller which is composed of a foamed elastic member mounted on a developing apparatus and which has a compression spring constant in the range of 0.25 to 5.0 N/mm and a surface friction resistance in the range of 0.4 to 1.2 N. The elastic member has low surface-friction resistance and uniform fine cells, and is well suited as a member for image formation equipment.

11 Claims, 3 Drawing Sheets

ELASTIC MEMBER AND IMAGE FORMATION EQUIPMENT

BACKGROUND OF THE INVENTION

1. Field of the Invention

The present invention relates to an elastic member which is used in image formation equipment such as electrophotographic equipment, electrostatic recording equipment and toner flying recording equipment. More particularly, the present invention is concerned with an elastic member which has low surface-friction-resistance and fine cells; and with image formation equipment equipped with the aforesaid elastic member.

Moreover, the present invention relates to a toner supply roller in a developing apparatus of a printer for electrophotography, electrostatic recording and the like. More particularly, the present invention pertains to a toner supply roller mounted on a developing apparatus which comprises a toner cartridge accommodating a toner as a developer, the toner supply roller and a developing roller, and which forms toner image by supplying the toner to a static latent image on the surface of a photosensitive body.

2. Description of the Related Arts

In recent years, accompanying the advancement of electrophotographic technique, an intermediate-resistance elastic roller has attracted attention as a transfer member, a toner supply member, an electrifying member and the like each for dry electrophotographic equipment, and is used as a transfer roller, a developing roller, a toner supply roller, an electrifying roller and the like. Incidentally, there have heretofore been employed a high molecular elastomer and high molecular foam each having rubbery elasticity as a material constituting the above-mentioned intermediate-resistance elastic roller.

Examples of the members which have hitherto been employed for the above-mentioned purpose include such elastomer or foam as NBR, EPDM, silicone rubber, polyurethane and the like, which is imparted with electroconductivity with electroconductive carbon such as carbon black, a metal oxide, an ionic electroconductive agent or the like. There are also employed, depending upon the purpose of use, non-electroconductive members that are not incorporated with an electroconductivity imparting agent.

Of the elastomer or foam as mentioned above, polyurethane is preferably used in the aforesaid electroconductive member, since polyurethane can be made into a low hardness member well suited for the above-mentioned member, and can be made into a low hardness foam by a method using such a foaming agent as water and a compound having a low boiling point, a mechanically agitational method or the like method. Further, it is possible to lower the hardness of polyurethane foam by selecting a raw material which determines the chemical structure of polyurethane and its blending amount.

There is used a roller which comprises urethane foam or silicone foam as a toner supply member in electrophotographic equipment. The urethane foam is widely used because of its high mechanical strength and inexpensiveness in comparison with silicone foam.

In electrophotographic equipment, a toner is supplied from a toner cartridge onto a developing roller through a toner supply roller. In this case, the toner is repeatedly subjected to compression or friction between the toner supply roller and the developing roller, sometimes bringing about agglomeration or fused adhesion. As a result, there is caused as the case may be, defective images wherein streaky unevenness in color appears in an electrophotograph by the accumulation of agglomerates or fusedly adhered matters between the developing roller and a developing blade. In order to prevent such defective images, it is deemed necessary to lower the friction resistance on the surface of a toner supply roller.

Among a variety of methods available for lowering the friction resistance on the surface of a toner supply roller, it is considered to be effective to employ silicone which exerts such effect that enhances the lubricity and improve slidability.

There are available various methods for applying silicone to a toner supply roller composed of polyurethane foam. It has been confirmed by the present inventors that the friction resistance on the surface of a toner supply roller can greatly be lowered by coating the surface thereof with silicone by means of spraying or the like, for which patent application has been made by the present inventors. Incidentally, the above-mentioned method enables to lower the surface friction resistance and assure favorable images in the early stage but, when a printing endurance test is effected for a long period of time, sometimes brings about defective images due to agglomeration or fused adhesion of a toner depending upon the printing conditions.

In addition, a method in which silicone as a blending agent for urethane is added to a starting material for urethane foam, fails in many cases to assure objective foam having fine and uniform cells, since the addition of silicone inhibits the stability of cells at the time of urethane foaming because of the anti-foaming properties or foam breaking properties inherent in silicone. In the case of a toner supply roller, since it is required in particular that the cells be fine (50 to 200 numbers/25 mm) and uniform, how to stabilize the cells has been a technological subject of much importance in the case of adding silicone.

In recent years, there has widely been introduced an electroconductive roller system in a developing roller and toner supply roller that are employed in a developing apparatus which is arranged on a developing process in electrophotographic equipment such as an electronic copying machine, laser beam printer and facsimile machine. In the foregoing system, the toner supply roller is rubbed against the developing roller so as to frictionally electrify the toner, and thus is required to possess a stable friction property (pressing force) with the developing roller and also an enhanced toner supply property to frictional portions and positions.

Such being the case, in conventional toner supply rollers of this type, there is generally employed a foamed elastic material wherein rubber or polyurethane has been foamed.

However, as a result of investigation made by the present inventors on the performance of the conventional toner supply roller comprising the foamed elastic body, it has been proved that when the toner which is conveyed to a developing roller is fusedly adhered to a toner regulating blade and the fusedly adhered toner layer gradually grows to such an extent that it interferes with the toner layer supported on the developing roller, then there is formed a portion through which the toner layer supported thereon can not pass, and development is made in the absence of the toner in the aforesaid limited portion with a result that there are often caused such troubles as unprinted white portion in the developed image owing to failure to supply the toner.

SUMMARY OF THE INVENTION

It is an object of the invention to provide an elastic member which has low surface-friction-resistance and fine cells, and which comprises silicone-modified polyurethane foam; and also image formation equipment equipped with the above-mentioned elastic member.

It is another object of the invention to provide a developing apparatus which is capable of assuring images free from any trouble such as unprinted white portion due to failure to supply a toner, and which comprises a toner supply roller mounted thereon and composed of a foamed elastic body.

Other objects of the invention will be obvious from the text of this specification hereinafter disclosed.

In such circumstances, intensive extensive research and investigation were accumulated by the present inventors on an elastic member which has low surface-friction-resistance and fine cells, and which comprises silicone-modified polyurethane foam. As a result, it has been found that silicone-modified polyurethane foam is obtainable which has fine uniform cells, surface friction resistance of at most 1.0 N and the number of cells in the range of 50 to 200/25 mm, by using a modified silicone oil bearing a functional group reactive with isocyanate as a modified silicone oil and a foam stabiizer which comprises a polyether-modified silicone containing 50 to 100% by weight of a polyoxyethylene unit in the polyether moiety; and that an elastic member comprising such polyurethane foam is well suited as a member mounted on image formation equipment.

Moreover, as a result of investigation made by the present inventors on a toner supply roller which has brought about the above-mentioned defective image, the following has been found. Specifically, while simultaneously with toner supply a toner supply roller rubs a toner against a developing roller for the purpose of electrifying the toner existing between the toner supply roller and the developing roller, when the rubbing force is too strong, an increase in damage to the toner deteriorates itself, whereby the toner thus deteriorated is liable to be adhesively solidified.

Further accumulated investigation led to the findings that the above-mentioned rubbing force is greatly influenced by the hardness and the friction resistance of the toner supply roller and also by the pressing force between the toner supply roller and the developing roller; and that trouble-free images can be formed, when the hardness (compression spring constant) and the friction resistance of the toner supply roller as well as the pressing force between the toner supply roller and developing roller are each set on an appropriate value.

Thus the present invention has been accomplished on the basis of the foregoing findings and information.

That is to say, the present invention provides an elastic member which comprises (A) polyurethane foam obtained by agitationally mixing a urethane prepolymer, a foaming agent and a foam stabiizer, wherein the urethane prepolymer is synthesized from a polyol and a polyisocyanate in the presence of a modified silicone oil added thereto, or (B) polyurethane foam obtained by agitationally mixing a polyol, a polyisocyanate, a modified silicone oil, a foaming agent and a foam stabiizer, wherein the modified silicone oil is a modified silicone oil bearing a functional group reactive with a polyisocyanate and the foam stabiizer is a foam stabiizer which comprises a polyether modified silicone containing 50 to 100% by weight of a polyoxyethylene unit in the polyether moiety; and also provides image formation equipment equipped with the aforesaid elastic member.

In addition thereto, the present invention provides a toner supply roller constituted of a foamed elastic member mounted on a developing apparatus which comprises a toner cartridge that accommodates a toner as a developer, the toner supply roller and a developing roller, and which forms a toner image by supplying the toner to a static latent image on the surface of a photosensitive body, characterized in that the toner supply roller has a compression spring constant in the range of 0.25 to 5.0 N/mm and a surface friction resistance in the range of 0.4 to 1.2 N.

DESCRIPTION OF PREFERRED EMBODIMENT

Figure 1:
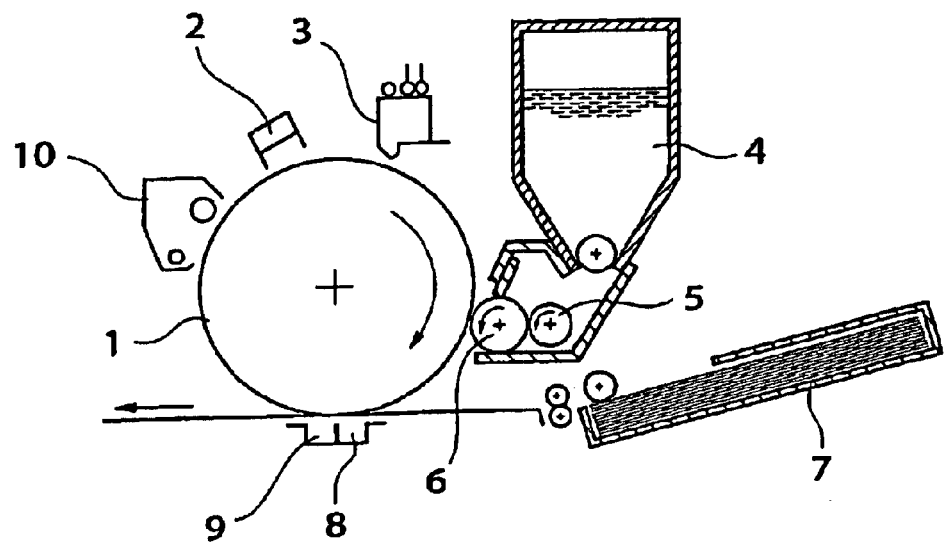
FIG. 1 is a schematic illustration showing the developing portion of a laser printer as an example of the developing apparatus according to the present invention.

The elastic member according to the present invention comprises (A) polyurethane foam obtained by agitationally mixing a urethane prepolymer, a foaming agent and a foam stabiizer wherein the urethane prepolymer is synthesized from a polyol and a polyisocyanate in the presence of a modified silicone oil added thereto or (B) polyurethane foam obtained by agitationally mixing a polyol, a polyisocyanate, a modified silicone oil, a foaming agent and a foam stabiizer.

The modified silicone oil that is to be used in the present invention is a modified silicone oil bearing a functional group reactive with isocyanate, and is exemplified by an alcohol-modified silicone oil, an ether-modified silicone oil and an amino-modified silicone oil.

The alcohol-modified silicone oil is exemplified by, for instance, the substance as represented by the following formula (1):

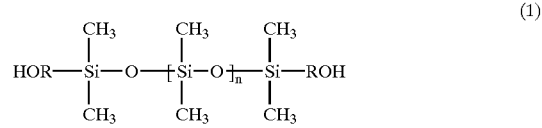

wherein R denotes an alkylene group and n denotes the number of repetition. Examples of the alkylene group include methylene group; dimethylmethylene group; 1,2-ethylene group; dimethyl-1,2-ethylene group; 1,4-tetramethylene group; and 1,2-cyclopropylene group.

The ether-modified silicone oil is exemplified by, for instance, the substance as represented by the following formula (2):

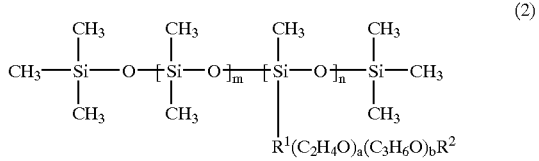

(2)

wherein $R^1$ denotes an alkylene group, $R^2$ denotes an alkyl group, and a, b and m each denotes the number of repetition. Examples of the alkylene group include those same as exemplified above. Examples of the alkyl group include methyl group, ethyl group, n-propyl group, isopropyl group, n-butyl group, isobutyl group, sec-butyl group, tert-butyl group, pentyl group, hexyl group, octyl group and decyl group.

The amino-modified silicone oil is exemplified by, for instance, the substance as represented by the following formula (3):

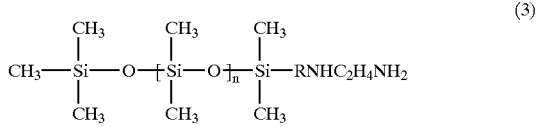

(3)

wherein R denotes an alkylene group and n denotes the number of repetition. Examples of the alkylene group include those same as exemplified above.

The constitution of the modified silicone oil include one end-modified type and both ends-modified type. With a view to further lessen the surface friction resistance of polyurethane foam, the modified silicone oil of one end-modified type is preferable. Of the modified silicone oil of one end-modified type, is more preferable a modified silicone oil having two functional groups, since it can further lessen the surface friction resistance of polyurethane foam, and in the case where a toner supply roller composed of this polyurethane foam is mounted on image formation equipment, agglomeration, adhesion solidification, fusing adhesion and the like of the toner are minimized, whereby defective images are less liable to take place.

The amount of the modified silicone oil to be added is preferably 0.1 to 5.0 parts by weight, more preferably 0.3 to 3.0 parts by weight on the basis of 100 parts by weight of the prepolymer in the above-mentioned polyurethane foam (A) or 100 parts by weight of the polyol in the foregoing polyurethane foam (B).

In the present invention, use is made as a foam stabilizer, of polyether-modified silicone containing 50 to 100% by weight, preferably 70 to 100% by weight of a polyoxyethylene unit in the polyether moiety. By using a foam stabilizer composed of such polyether-modified silicone as containing a relatively high content of polyoxyethylene unit, it is made possible to obtain polyurethane foam having fine and uniform structure even if a modified silicone oil having foam breaking property is added.

The blending amount of the foam stabilizer composed of the polyether-modified silicone is preferably 0.5 to 5.0 parts by weight, more preferably 0.8 to 3.0 parts by weight on the basis of 100 parts by weight of the prepolymer in the above-mentioned polyurethane foam (A) or 100 parts by weight of the polyol in the foregoing polyurethane foam (B).

The polyol to be used in the present invention is such that the whole or part of the polyol is polyether polyol and the content of the ethylene oxide unit is preferably 5 to 80% by weight, particularly preferably 10 to 70% by weight based on the total amount of the polyol components. The polyether polyol is formed by subjecting propylene oxide and ethylene oxide to addition polymerization onto a polymerization initiator such as glycerol, trimethylolpropane, ethylene glycol, propylene glycol, pentaerythritol and sorbitol. The polymer polyol has the number of functional groups in the range of preferably 2 to 6, more preferably 2.5 to 4 and a weight average molecular weight in the range of preferably 2000 to 6000 particularly preferably 2500 to 5000.

As the polyisocyanate to be used in the present invention, there is preferably used polyisocyanate the isocyanate component of which is free from an unsaturated bond and is exemplified by tolylene diisocyanate (TDI), diphenylmethane diisocyanate (MDI), crude diphenylmethane diisocyanate(crude MDI), isophorone diisocyanate, hydrogenated diphenylmethane diisocyanate, hydrogenated tolylene diisocyanate and hexamethylene diisocyanate, any of the polyisocyanate modified with isocyanurate, carbodiimide, glycol or the like. Of these is particularly preferable TDI-80 which has the ratio by weight of 2,4-tolylenediisocyanate to 2,6-tolylenediisocyanate being 80/20.

It is possible to produce favorable polyurethane foam which has low surface-friction-resistance and fine cells from the polyisocyanate to be used in the present invention by any of a process in which the polyisocyanate is reacted with a polyol in advance to form urethane prepolymer, which is then reacted by one shot process, with polyurethane foam polyol obtained by agitationally mixing a foaming agent and a foam stabilizer; and a process in which the polyisocyanate is reacted with a polyol in advance to form urethane prepolymer, which is then reacted with water, a foaming agent such as a low boiling point compound and a chain extender.

The elastic member according to the present invention is applicable to both non-electroconductive members and electroconductive members. In the case where it is made into an electroconductive member, it is imparted with electroconductivity preferably by means of a carbon electroconductive agent. As a carbon electroconductive agent, there is preferably used an aqueous dispersion of carbon in order to prevent the viscosity of polyurethane foam as a starting material from being increased by the addition of carbon, thereby causing insufficiency in agitational mixing. The aqueous dispersion of carbon is formed by dispersing carbon black in water through a method in which a surfactant or a coupling agent is added to carbon black, a method in which carbon black is surface treated, or the like method. There is preferably used the aqueous dispersion which contains 2 to 40% by weight, particularly 5 to 20% by weight of carbon black. As carbon black to be used herein, mention is made of gas black such as electrochemical black, ketchen black and acetylene black, oil furnace black containing ink black, thermal black, channel black and lump black.

Examples of the catalyst for the purpose of curing polyurethane foam include monoamines such as triethylamine and dimethylcyclohexylamine; diamines such as tetramethylethylenediamine, tetramethylpropanediamine and tetramethylhexanediamine; triamines such as pentamethyldiethylenetriamine, pentamethyldipropylenetriamine and tetramethylguanidine; cyclic amines such as triethylenediamine, dimethylpiperazine, methylethylpiperazine, methylmorpholine, dimethylaminoethylmorpholine and dimethylimidazole; alcoholamines such as dimethylaminoethanol, dimethylaminoethoxyethanol, trimethylaminoethylethanolamine, methylhydroxyethylpiperazine and hydroxyethylmorpholine; ether amines such as bis(dimethylaminoethyl) ether and ethylene glycol bis-(dimethyl)aminopropyl ether; and organometal compounds such as stannous octonate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, phenylmercury propionate and lead octenate. Of these, organotin compounds as a catalyst are particularly preferable. Any of the above-mentioned catalysts may be used alone or in combination with at least one other.

Moreover, at the time of agitationally mixing urethane prepolymer and water in the present invention, any of other additives may be added at need to the mixture, including a flame retardant, an improver for punching/cutting/processing properties, an organic filler and an inorganic filler.

It is possible in the elastic member according to the present invention that polyurethane foam has the number of cells in the range of 50 to 200 per 25 mm as well as surface friction resistance of at most 0.1 N. The elastic member, whether it is a non-electroconductive member or an electroconductive member, can be used for a variety of purposes, of which the electroconductive member is particularly preferably used as a toner supply member of image formation equipment. Further the elastic member, when being made into the form of roller, can be in such configuration in which polyurethane foam is formed around a metallic shaft. There are usable as a material for a metallic shaft, galvanized steel such as galvanized sulfur free cutting steel, aluminum, stainless steel and phosphor bronze and the like material.

The toner supply roller according to the present invention has a hardness (compression spring constant) in the range of 0.25 to 5.0 N/mm, preferably 0.4 to 4.0 N,/mm, particularly preferably 0.7 to 3.0 N/mm. The compression spring constant thereof, when being less than 0.25 N/mm, gives rise to such disadvantage as insufficient frictional electrification of a toner, whereas said constant, when being more than 5.0 N/mm, results in such disadvantage as marked increase in damage to a toner.

With regard to the toner supply roller according to the present invention, the foamed elastic body which constitutes the surface thereof has a friction resistance in the range of 0.4 to 1.2 N, preferably 0.4 to 0.8 N. The friction resistance thereof, when being less than 0.4 N, gives rise to such disadvantage as excessive slippage, thus causing incapability of conveying a toner, whereas the friction resistance thereof, when being more than 1.2 N, results in such disadvantage as an unreasonable increase in damage to a toner, whereby the toner is more liable to deterioration.

The average foamed cell diameter of a foamed elastic body which constitutes the toner supply roller according to the present invention is in the range of preferably 20 to 400 μm more preferably 100 to 300 μm.

The average foamed cell diameter of the foamed elastic body, when being smaller than 20 μm, brings about a fear that clogging due to toner takes place, thus unreasonably increasing the hardness in the vicinity of the roller surface, whereas the foregoing diameter, when being larger than 400 μm, brings about a fear of unreasonable increase in the amount of the toner which penetrates into the inside of the roller, causing incapability of suitable toner supply. What is more, the number of cells per a length of 25 mm for the above-mentioned foamed elastic body is in the range of preferably 50 to 200, more preferably 60 to 150. The above-mentioned number of cells, when being less than 50, gives rise to a fear of incapability of uniform toner supply to the developing roller, whereas the foregoing number, when being more than 200, brings about a fear of incapability of sufficient scraping away of the residual toner on the developing roller.

In the case of equipping a developing apparatus with the toner supply roller according to the present invention, it is desirable to arrange the toner supply roller so that when the developing roller is in butt contact with the toner supply roller, the deformation of the former is substantially due to the deformation of the latter, the cutting amount in the latter by the former is 0.5 to 2 mm, preferably 0.5 to 1.5 mm.

The cutting amount in the toner supply roller by the developing roller, when being less than 0.5 mm, causes a fear that the toner allowed to remain on the developing roller can not sufficiently be scraped, whereas said cutting amount, when being more than 2 mm, brings about a fear that the toner can not sufficiently be conveyed to the developing roller.

The foamed elastic body which constitutes the toner supply roller needs only to be equipped with the aforestated properties and is exemplified, in addition to the foregoing polyurethane foam (A) and polyurethane foam (B), by ester-based polyurethane foam, ether-based polyurethane foam and foam of a rubber material such as nitrile rubber, ethylene-propylene rubber, ethylene-propylene-diene rubber, styrene-butadiene rubber, butadiene rubber, isoprene rubber, natural rubber, silicone rubber, acrylic rubber, chloroprene rubber, butyl rubber and epichlorohydrin rubber. Any of the above-exemplified foam may be used alone or in combination with at least one other. Of these are particularly preferable ester-based polyurethane foam, ether-based polyurethane foam, nitrile rubber foam, ethylene-propylene rubber foam, ethylene-propylene-diene rubber foam and silicone rubber foam.

It is possible, for the purpose of controlling the friction resistance of the toner supply roller according to the present invention, to mix a silicone oil in the starting material for the above-mentioned foam, or coat the surface of the foam with a silicone oil.

The toner supply roller according to the present invention may be electroconductive, and can be manufactured by forming an electroconductive foamed elastic layer outside a favorably electroconductive shaft such as a metallic shaft as is the case with the product which has hitherto been usually used as an electroconductive toner supply roller. There are usable as a material for the metallic shaft, galvanized steel such as galvanized sulfur free cutting steel, aluminum, stainless steel, phosphor bronze and the like material.

In the above-mentioned electroconductive foamed elastic layer, use is made of a foamed elastic material that is produced by imparting electroconductivity to a suitable foamed elastic body. Likewise, in the case of the electroconductive foamed elastic body, the number of cells per a length of 25 mm is in the range of preferably 50 to 200, more preferably 60 to 150.

Moreover, an ionic electroconductivity imparting agent and/or an electronic electroconductivity imparting agent is used as an electroconductivity imparting agent which is to be incorporated in the case of imparting electroconductivity to the foamed elastic body. Specific examples of the ionic electroconductivity imparting agent include ammonium salts such as perchlorates, chlorates, hydrochlorides, bromates, iodates, borofluorides, sulfates, ethyl sulfates, carboxylates, sulfonates, etc. of any of tetraethyl ammonium, tetrabutyl ammonium, dodecyltrimethyl ammonium such as lauryltrimethyl ammonium, hexadecyltrimethyl ammonium, octadecyltrimethyl ammonium such as stearyltrimethyl ammonium, benzyltrimethyl ammonium, modified aliphatic dimethylethyl ammonium, etc.; perchlorates, chlorates, hydrochlorides, bromates, iodates, borofluorides, trifluoromethyl sulfates, sulfonates, etc. of any of alkali metals such as lithium, sodium and potassium, or alkaline earth metals such as calcium and magnesium.

Examples of the electronic electroconductivity imparting agent include electroconductive carbon black such as ketchen black and acetylene black, carbon black for rubber such as SAF, ISAF, HAF, FEF, GPF, SRF, FT and MT; oxidation treated carbon black for ink; thermally cracked carbon black; natural graphite; artificial graphite; electroconductive metal oxides such as tin oxide, titanium oxide and zinc oxide; and metals such as nickel, copper, silver and germanium.

The above-exemplified electroconductivity imparting agent may be used alone or in combination with at least one other. The amount thereof to be added is not particularly limited. It is selected in the range of usually 0.01 to 5 parts by weight, preferably 0.05 to 2 parts by weight based on 100 parts by weight of the foregoing foamed elastic body in the case of the above-mentioned ionic electroconductivity imparting agent, and in the range of usually 1 to 50 parts by weight, preferably 5 to 40 parts by weight based on 100 parts by weight of the foregoing foamed elastic body in the case of the aforesaid electronic electroconductivity imparting agent. The electroconductive elastic layer may be properly and optionally incorporated at need, with an other additive for rubber such as well known filler and cross-linking agent in addition to the foregoing electroconductivity imparting agent.

Moreover in the case where polyurethane foam is used for forming the electroconductive foamed elastic body of the toner supply roller, it is preferable to limit the acetone extraction rate for the polyurethane foam to at most 5% by weight so as to prevent a toner from being fusedly adhered to a deposit on the surface of the roller. Such being the case, it is necessary to closely examine the blending amount of the electroconductivity imparting agent to be added thereto. That is to say, blending of a large amount of carbon black rich in volatile matters (for instance, channel black) increases the acetone extraction rate therefor, whereas blending of carbon black having a large oil absorption (for instance, acetylene black and oil furnace black with high structure) can decrease the acetone extraction rate therefor.

The developing roller which is employed in the developing apparatus according to the present invention is electroconductive, and can be manufactured by forming an electroconductive elastic layer on the outside of a highly electroconductive shaft as is the case with the product which has hitherto been usually used as an electroconductive developing roller. In the aforesaid electroconductive elastic layer, use is made of an elastic material that is produced by imparting electroconductivity to a suitable rubbery elastic body. The rubbery elastic body is not specifically limited, but may be selected for use from those that have hitherto been customarily used as an electroconductive developing roller.

Preferable examples of the rubbery elastic body include nitrile rubber, ethylene propylene rubber, ethylene propylene diene rubber, styrene butadiene rubber, butadiene rubber, isoprene rubber, natural rubber, silicone rubber, urethane rubber, acrylic rubber, chloroprene rubber, butyl rubber and epichlorohydrin rubber. The above-exemplified rubbery elastic body may be used alone or in combination with at least one other. Of the above-exemplified elastic body, are preferable nitrile rubber, urethane rubber, epichlorohydrin rubber, ethylene propylene rubber, ethylene propylene diene rubber and silicone rubber.

It is preferable in the developing roller according to the present invention to place a resin coating layer in a thickness of 1 to 100 μm on the surface thereof to control the friction resistance of the roller and also to prevent fouling of the photosensitive body, said resin being composed of for instance, alkyd resin, phenolic resin, melamine resin, a cross-linkable resin such as a mixture thereof, etc. The cross-linkable resin may be incorporated at need, with any of various additives such as an antistatic agent, a lubricant, an electroconductivity imparting agent, an other resin, etc. The resin coating layer can be formed usually by coating the elastic layer with a coating liquid in which a cross-linkable resin, a cross-linking agent and any of various additives are dissolved or dispersed in a liquid or a solvent exemplified by an alcohol-based solvent such as methanol and a ketone based solvent such as methyl ethyl ketone by means of dipping method, roll coater method, doctor blade method, spraying method or the like; and thereafter drying the coating liquid at ordinary temperature or at 50 to 170° C. to cross-linkably cure the dried coating.

FIG. 1 is a schematic illustration showing a developing portion of a laser printer which is one example of developing apparatus equipped with the toner supply roller according to the present invention.

The surface of a photosensitive body as shown by symbol 1 in FIG. 1 is uniformly charged with a primary electrifier 2. Thereafter an image signal transmitted from a control unit (not shown on the figure) is converted into an optical signal by the use of an LED array print head 3. The optical signal is exposed onto the surface of the photosensitive body 1 so as to form an electrostatic latent image, which is accommodated in a toner cartridge 4, and is developed with a toner that is supplied to the photosensitive body 1 via a toner supply roller 5 and a developing roller 6, so that a toner image is formed.

The toner image which has been formed on the surface of the photosensitive body 1 is transferred to the surface of paper supplied from a paper magazine 7 with a transfer electrifier 8 and fixed with a heat fixing apparatus 9. The paper is conveyed and discharged in the direction of the arrow. The photosensitive body 1 after the transfer is returned to the initial state with a cleaning unit 10.

Figure 2:
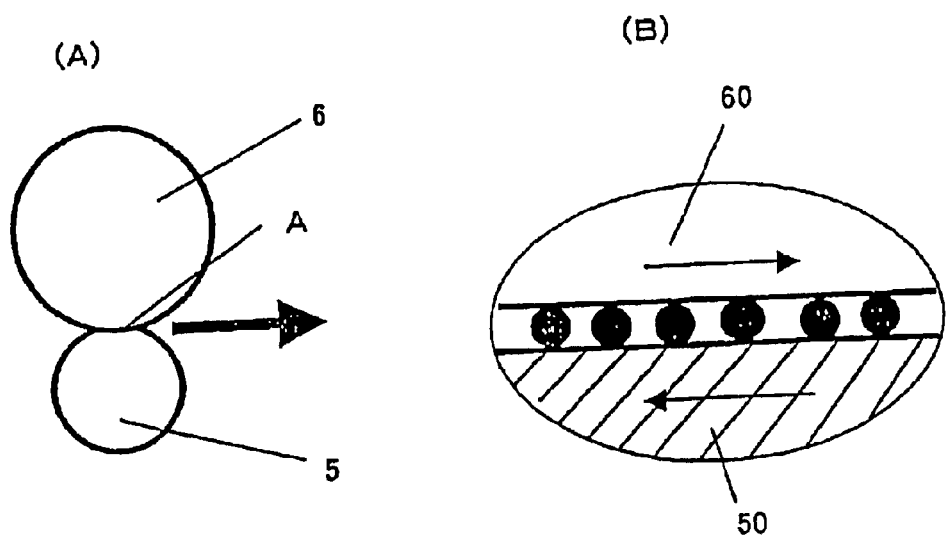
FIG. 2 is a scheme showing a mode of frictional electrification of toner by the toner supply roller and developing roller according to the present invention.

FIG. 2 is a scheme showing the mode of toner supply and frictional electrification with a toner supply roller 5 and a developing roller 6, in which FIG. 2(B) is an enlarged view for the portion as indicated by the symbol A in FIG. 2(A) Since the butt contact portion 60 of the toner supply roller 5 in the developing roller 6 and the butt contact portion 50 of the developing roller 6 in the toner supply roller 5 move in the direction of arrows, respectively, the toner sandwiched therebetween is frictionally electrified by being allowed to slide on the butt contact portion 60 in the direction opposite to the direction of progress by the friction force of the butt contact portion 50 as illustrated in FIG. 2(B). Thus, sliding occurs between the toner and the butt contact portion 60, so that the toner is electrified, whereby the electrified toner is supplied onto the developing roller 6.

Accordingly, the use of a toner supply roller which has appropriate friction resistance with the toner improves both the friction force (toner retainability) between the toner supply roller and the toner and at the same time, the friction force (toner slidability) between the developing roller and the toner. Such being the case, it is made possible to carry out toner supply and toner electrification with minimized damage to the toner, thereby enabling to perform development free from any defect.

In summarizing the working effect of the present invention, the elastic member according thereto has low surface-friction-resistance and fine structure cells, and is well suited for use as a member for image formation equipment such as a developer supply roller and a transfer roller.

Further, in the case of equipping a developing apparatus with the toner supply roller according to the present invention, it is made possible to prevent the occurrence of deterioration in the toner, since there are preferably and suitably carried out the pressing of the toner onto the developing roller by the toner supply roller, supply of the toner to the developing roller and also the frictional electrification for the toner thus supplied, whereby it is made possible to effect development which is free from any defect in image such as unprinted white portions. Furthermore, it is made possible thereby to favorably scrape away the toner allowed to remain on the developing roller, and consequently to form satisfactory images which is free from any defect such as unevenness in pitch or density for a long period of time.

In the following, the present invention will be described in more detail with reference to comparative examples and working examples, which however shall never limit the present invention thereto.

Characteristic tests were performed in the following manner for the rollers that were obtained in the working examples and comparative examples.

(1) Number of Cells

The number of cells in an image was measured by photography at a magnitude of about 70 using a CCD video camera manufactured by Hilock Co.,Ltd.

(2) Surface Friction Resistance

Figure 5:
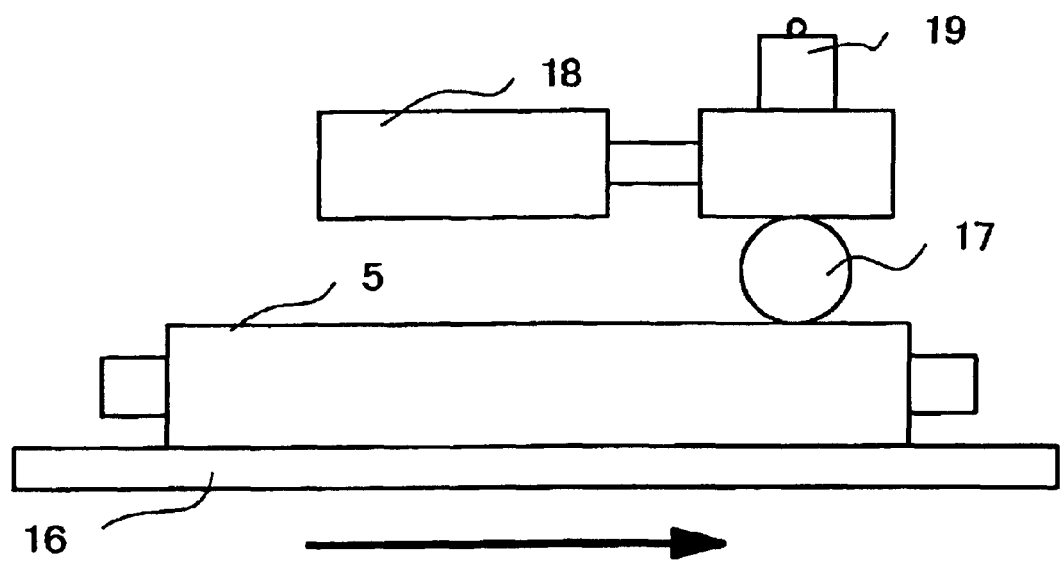
FIG. 5 is a schematic illustration showing a method for measuring the surface friction resistance of the roller as indicated in working examples.

A measurement was made of the surface friction resistance of each of rollers according to the procedure as shown in FIG. 5 by the use of a friction testing machine manufactured by Shintoh Scientific Co.,Ltd. under the trade name "HEIDON Tribogear". As illustrated in FIG. 5, a roller 5 was fixed to a mobile stage 16, and was moved in the direction of the arrow at a friction speed of 100 mm/min. The companion member of friction was a round bar 17 which was made of an acrylic resin and which had a diameter of 12 mm, was arranged perpendicularly to the roller 5, and was subjected to friction at a load of 1 N by means of a load weight 19. The friction resistance at that time was measured with a load cell 18. The reason why the acrylic resin have been selected as the companion member of friction was that the principal component of the toner was similar to an acrylic material, and that the friction by the combination therebetween simulates the friction between the toner supply roller and the toner.

EXAMPLE 1

Into an enclosable vessel were weighed 90 parts by weight of polyether polyol which had a weight average molecular weight of 5000 and which had been produced by the addition to glycerol, of 15% by weight of ethylene oxide and 85% by weight of propylene oxide; 20 parts by weight of tolylene diisocyanate (TDI-80); and 0.55 part by weight of an alcohol-modified silicone oil which had an OH equivalent of 1250 and which had two functional groups at one terminal (manufactured by Shin-Etsu Chemical Co.,Ltd. under the trade name "X-22-176B"). Then, the content in the vessel was sufficiently mixed with agitation in an atmosphere of dry air. Thereafter, the vessel was closed with a lid, was put in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.8 part by weight of a solution of triethylenediamine with 33% concentration as the catalyst in dipropylene glycol, and with 2.5 parts by weight as the foam stabilizer, of polyether-modified silicone in which 70% by weight of ether chains was composed of polyoxyethylene, thus making a total of 30.3 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.5/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 80 numbers/a length of 25 mm and surface friction resistance of 0.87 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and a relative humidity (RH) of 50% for 48 hours. Thereafter, gray images (density of 8%) were printed with a result that satisfactory images were obtained. Then, white solid images were continuously printed in 1000 numbers of sheets, and thereafter, gray images were again printed. As a result, satisfactory images were obtained.

EXAMPLE 2

Into an enclosable vessel were weighed 60 parts by weight of polyether polyol which had a weight average molecular weight of 5000 and which had been produced by the addition to glycerol, of 15% by weight of ethylene oxide and 85% by weight of propylene oxide; 60 parts by weight of polyether polyol which had a weight average molecular weight of 3400 and which had been produced by the addition to glycerol, of 75% by weight of ethylene oxide and 25% by weight of propylene oxide; 20 parts by weight of tolylene diisocyanate (TDI-80); and 0.55 part by weight of an alcohol-modified silicone oil which had an OH equivalent of 1250 and which had two functional groups at one terminal (manufactured by Shin-Etsu Chemical Co.,Ltd. under the trade name "X-22-176B"). Then, the content in the vessel was sufficiently mixed with agitation in an atmosphere of dry air. Thereafter, the vessel was closed with a lid, was placed in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.5 part by weight of a solution of triethylenediamine with 33% concentration as the catalyst in dipropylene glycol, and with 2.5 parts by weight as the foam stabilizer, of polyether-modified silicone in which 100% by weight of ether chains was composed of polyoxyethylene, thus making a total of 30.0 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.5/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 100 numbers/a length of 25 mm and surface friction resistance of 0.82 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and a relative humidity (RH) of 50% for 48 hours. Thereafter, gray images (density of 8%) were printed with a result that satisfactory images were obtained. Then, white solid images were continuously printed in 1000 numbers of sheets, and thereafter, gray images were again printed. As a result, satisfactory images were obtained.

EXAMPLE 3

Into an enclosable vessel were weighed 90 parts by weight of polyether polyol which had a weight average molecular weight of 5000 and which had been produced by the addition to glycerol, of 15% by weight of ethylene oxide and 85% by weight of propylene oxide; 20 parts by weight of tolylene diisocyanate (TDI-80); and 1.10 part by weight of a bifunctional alcohol-modified silicone oil which had an OH equivalent of 500 and which had one functional group at each of both the terminals (manufactured by Nippon Unicar Co.,Ltd. under the trade name "FZ 3722"). Then, the content in the vessel was sufficiently mixed with agitation in an atmosphere of dry air. Thereafter, the vessel was closed with a lid, was put in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.8 part by weight of a solution of triethylenediamine with 33% concentration as the catalyst in dipropylene glycol, and with 2.5 parts by weight as the foam stabilizer, of polyether modified silicone in which 70% by weight of ether chains was composed of polyoxyethylene, thus making a total of 30.3 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.5/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 80 numbers/a length of 25 mm and surface friction resistance of 0.94 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and a relative humidity (RH) of 50% for 48 hours. Thereafter, gray images (density of 8%) were printed with a result that satisfactory images were obtained. Then, white solid images were continuously printed in 1000 numbers of sheets, and thereafter, gray images were again printed. As a result, satisfactory images were obtained.

EXAMPLE 4

Into an enclosable vessel were weighed 90 parts by weight of polyether polyol which had a weight average molecular weight of 5000 and which had been produced by the addition to glycerol, of 15% by weight of ethylene oxide and 85% by weight of propylene oxide; 20 parts by weight of tolylene diisocyanate (TDI-80); and 1.10 part by weight of an ether-modified silicone oil which had an OH equivalent of 1600 and which had functional groups at side chains (manufactured by Dow Corning Toray Co., Ltd. under the trade name "SF 8428"). Then, the content in the vessel was sufficiently mixed with agitation in an atmosphere of dry air. Thereafter, the vessel was closed with a lid, was put in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.8 part by weight of a solution of triethylenediamine with 33% concentration as the catalyst in dipropylene glycol, and with 2.5 parts by weight as the foam stabilizer, of polyether-modified silicone in which 70% by weight of ether chains was composed of polyoxyethylene, thus making a total of 30.3 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.5/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 80 numbers/a length of 25 mm and surface friction resistance of 0.91 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and a relative humidity (RH) of 50% for 48 hours. Thereafter, gray images (density of 8%) were printed with a result that satisfactory images were obtained. Then, white solid images were continuously printed in 1000 numbers of sheets, and thereafter, gray images were again printed. As a result, satisfactory images were obtained.

EXAMPLE 5

Into an enclosable vessel were weighed 100 parts by weight of polyether polyol which had a weight average molecular weight of 5000 and which had been produced by the addition to glycerol, of 15% by weight of ethylene oxide and 85% by weight of propylene oxide; 0.55 part by weight of an alcohol-modified silicone oil which had an OH equivalent of 1250 and which had two functional groups at one terminal (manufactured by Shin-Etsu Chemical Co.,Ltd. under the trade name "X-22-176B"); 1.30 part by weight of water; 0.8 part by weight of a solution of triethylenediamine with 33% concentration as the catalyst in dipropylene glycol and 2.5 parts by weight as a foam stabilizer, of polyether-modified silicone in which 50% by weight of ether chains was composed of polyoxyethylene, thus making a total of 105.15 parts by weight under sufficient mixing by means of an agitator to produce a preliminary mixture of polyol {component (a)}.

Thereafter, a tank of a foaming machine was charged with the above prepared component (a) and an isocyanate component {component (b)} consisting of 80% by weight of tolylene diisocyanate (TDI-80) and 20% by weight of crude diphenylmethane diisocyanate (crude MDI-80); the discharge flow rate was regulated to a ratio of component (a)/component (b) being 100.15/21.00; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 85 numbers/a length of 25 mm and surface friction resistance of 0.89 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and a relative humidity (RH) of 50% for 48 hours. Thereafter, gray images (density of 8%) were printed with a result that satisfactory images were obtained. Then, white solid images were continuously printed in 1000 numbers of sheets, and thereafter, gray images were again printed. As a result, satisfactory images were obtained.

COMPARATIVE EXAMPLE 1

Into an enclosable vessel were weighed 90 parts by weight of polyether polyol which had a weight average molecular weight of 5000 and which had been produced by the addition to glycerol, of 15% by weight of ethylene oxide and 85% by weight of propylene oxide; and 20 parts by weight of tolylene diisocyanate (TDI-80). Then, the content in the vessel was sufficiently mixed with agitation in an atmosphere of dry air. Thereafter, the vessel was closed with a lid, was put in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.8 part by weight of a solution of triethylenediamine with 33% concentration as the catalyst in dipropylene glycol, and with 2.5 parts by weight as the foam stabilizer, of polyether modified silicone in which 50% by weight of ether chains was composed of polyoxyethylene, thus making a total of 30.3 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.5/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had uniform cells having 80 numbers/a length of 25 mm and surface friction resistance of 1.55 N.

Subsequently, the foam thus obtained was cut into a piece measuring 28 mm×28 mm×240 mm in size by the use of a vertical cutter, and in the central part of the plane with 28 mm×28 mm in size, there was made a through hole having a diameter of 5.0 mm perpendicularly to the plane. Then a metallic shaft with 6.0 mm in diameter was inserted into the through hole. The foam with the shaft was heated for 70 minutes in an oven at 120° C. of hot air circulation type so as to adhere the shaft to the foam. The resultant shafted polyurethane foam was polished by the use of a polishing machine, and both the ends of the foam was cut off to prepare an electroconductive roller which was made of polyurethane foam and had an outer diameter of 13.4 mm with a length of polyurethane foam portion being 217 mm.

The above prepared roller was integrated in a dry type electrophotographic apparatus to serve as a toner supply roller, and allowed to stand under a temperature of 20° C. and an RH of 50% for 48 hours. Thereafter, gray images (density of 8%) were printed with a result that satisfactory images were obtained. Then, white solid images were continuously printed in 1000 numbers of sheets and thereafter, gray images were again printed. As a result, streaky unevenness in color appeared in the images.

COMPARATIVE EXAMPLE 2

Into an enclosable vessel were weighed 90 parts by weight of polyether polyol which had a weight average molecular weight of 5000 and which had been produced by the addition to glycerol, of 15% by weight of ethylene oxide and 85% by weight of propylene oxide; 20 parts by weight of tolylene diisocyanate (TDI-80); and 0.55 part by weight of an alcohol-modified silicone oil which had an OH equivalent of 1250 and which had two functional groups at one terminal (manufactured by Shin-Etsu Chemical Co.,Ltd. under the trade name "X-22-176B"). Then, the content in the vessel was sufficiently mixed with agitation in an atmosphere of dry air. Thereafter, the vessel was closed with a lid, was put in an oven at 60° C. of hot air circulation type, and heated for 48 hours to produce a prepolymer {component (a)}.

Subsequently, 27 parts by weight of aqueous dispersion of carbon which contained electroconductive carbon and which had a carbon content of 8% by weight was incorporated with 0.8 part by weight of a solution of triethylenediamine with 33% concentration as the catalyst in dipropylene glycol, and with 2.5 parts by weight as the foam stabilizer, of reactive silicone in which 50% by weight of ether chains was composed of polyoxyethylene, making a total of 30.3 parts by weight under sufficient mixing by means of an agitator to produce a mixture {component (b)}.

Thereafter, the above prepared component (a) and component (b) were charged into a tank of a foaming machine; the discharge flow rate was regulated to a ratio of component (a)/component(b) being 100.0/30.3; the two components were agitationally mixed with an impeller at the number of revolutions of about 3000 rpm; the resultant mixture was poured in an aluminum made mold which measured 400 mm×60 mm×60 mm in inside dimensions and in which a heat resistant rubber packing was packed on a ground finished portion between the top force and bottom force so as to foam the components therein; the mold was closed with a lid prior to the overflowing of polyurethane foam; the top force of the mold was fixed with a toggle clamp; the closed mold was placed in an oven at 100° C. of hot air circulation type; and the polyurethane foam was cured by heating for 15 minutes at 100° C. and made into electroconductive polyurethane foam.

The polyurethane foam thus prepared had coarse and non-uniform cells having about 30 numbers/a length of 25 mm, thus making itself unusable as a member for image formation equipment such as a toner supply roller or a transfer roller.

EXAMPLES 6 to 8 COMPARATIVE EXAMPLES 3 TO 6

The printer as illustrated in FIG. 1 was incorporated with a developing roller A in combination with a toner supply roller B, C, D, E, F, G, or H and subsequently, images were formed under environmental conditions of constant temperature and constant humidity (25° C., 50% RH) to evaluate the images thus formed.

The developing roller A which was used therein was manufactured by the following method.

By the use of a mixer, a polyol composition was prepared by mixing 100 parts by weight of polyether polyol having a molecular weight of 5000 and an OH value of 33 mg KOH/g which had been prepared by adding propylene oxide and ethylene oxide to glycol; 1.0 part by weight of 1,4-butanediol; 0.5 part by weight of nickel acetylacetonato; 0.01 part by weight of dibutyltin dilaurate and 0.2 part by weight of sodium perchlorate. The polyol composition thus prepared was defoamed by stirring under reduced pressure, then incorporated with 17.5 parts of urethane-modified MDI (diphenylmethane diisocyanate), and stirred for 2 minutes.

Subsequently, the resultant mixture was cast into a mold in which a metallic shaft had been heated in advance to 110° C., was cured at 110° C. for 2 hours to form an electroconductive elastic layer on the outer periphery of the metallic shaft and thus to obtain a roller. The surface of the roller thus obtained was polished and adjusted to an average roughness Rz of 4.0 μm according to JIS 10 points.

Subsequently, a resin for forming a resin-coated layer was prepared by mixing an oil-free alkyd resin (manufactured by Dainippon Ink and Chemicals, Inc. under the trade name "M 6402") and a melamine resin (solid content rate of 60% by weight, manufactured by Dainippon Ink and Chemicals, Inc. under the trade name "Superbekkamin L-145-60") so as to attain a solid content ratio by weight of the oil-free alkyd resin to the melamine resin being 8/20 in methyl ethyl ketone as the solvent, wherein the solid concentration was adjusted to 20% by weight.

Subsequently, 100 parts by weight expressed in terms of solid content of the resultant mixture was mixed with 20 parts (20 phr) by weight of carbon (average particle diameter of 18 nm, manufactured by Degussa Corp. under the trade name "Printex L6"), and the resultant mixture was dispersed by the use of a paint shaker to prepare a coating solution.

The above-prepared roller was immersed into the coating solution thus prepared, drawn up, and heated at 130° C. for 3 hours to cure the same and thus produce a developing roller A, which had the resin coated layer and an outside diameter of 16.0 mm.

In addition, toner supply rollers B, C, D, E, F, G and H which were used here were produced by the method as described hereunder.

There were sufficiently stirred 20 parts by weight of polymer polyol having about 28% by weight of solid content composed, as a base polyol, of polyether polyol which had a weight average molecular weight of 5000 and which had been prepared by the addition to glycerol, of 15% by weight of ethylene oxide and 85% by weight of propylene oxide; 40 parts by weight of hydrophilic polyether polyol which had a weight average molecular weight of 3400 and which had been prepared by the addition to glycerol, of 75% by weight of ethylene oxide and 25% by weight of propylene oxide; 40 parts by weight of polyether polyol which had a weight average molecular weight of 4800 and which had been prepared by the addition to glycerol, of 15% by weight of ethylene oxide and 85% by weight of propylene oxide; and 21 parts by weight of tolylene diisocyanate (TDI-80). The resultant stirred mixture was heated to 60° C., and stirred every 12 hours repeatedly. Thus after 48 hours there was obtained a prepolymer of polyether polyol.

Subsequently, 100 g of the resultant prepolymer was mixed with the mixture prepared by dissolving, in 27 parts by weight of aqueous carbon dispersion containing electroconductive carbon and having a carbon content of 8%, 0.1 part by weight of a solution with 70% concentration of bis-(dimethylaminoethyl) ether as the catalyst in dipropylene glycol and 2.5 parts by weight of a foam stabilizer composed of polyether-modified silicone in which 70% of ether chains consisted of polyoxyethylene, thus making a total of 29.6 parts by weight.

Then the resultant mixture was poured into a cylindrical mold the inside of which was coated with Teflon and an end of which was closable with a detachable cap in different filling amounts, and the end was closed with the cap. Subsequently, the mold containing the mixture was allowed to stand in a hot air oven regulated to 70° C. for 8 to 10 hours to obtain foamed and cured polyurethane foam products each having different hardness (compression spring constant).

Subsequently, the cured polyurethane foam was removed from the mold by removing the cap at the end of the mold, passed through a roll, and subjected to glassing treatment.

Then, a hole having a diameter of 5 mm was bored at the center of the circular end of the cylindrical column, and into the hole was pressed a shaft which was made of galvanized sulfur free cutting steel, and was coated thereon with an adhesive and which had an outside diameter of 6.0 mm and a length o 240 mm. The shafted polyurethane foam was subjected to heating adhesion treatment for 15 minutes in an oven at 60° C., and thereafter was polished with a grindstone, so that the outside diameter of the cylindrical column was made to be 13.0 mm. Thereafter each of the rollers was coated with silicone oil in different coating amounts to regulate the friction resistance thereof, thereby preparing seven kinds of toner supply rollers B, C, D, E, F, G and H each having different hardness (compression spring constant) and also different friction resistance. The number of cells per a length of 25 mm and cell diameter for each of the foamed elastic body were determined by photographing at a magnitude in the range of 40 to 60 using a CCD video camera (manufactured by Hilocks Inc.) and measuring the cell diameter and measuring the number of cells according to JIS K6402.

Figure 3:
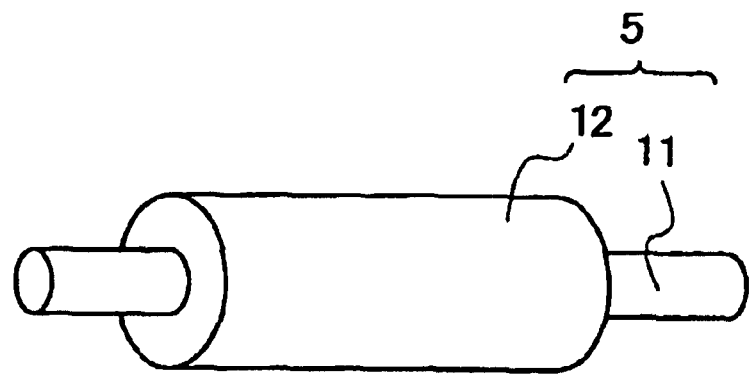
FIG. 3 is a schematic perspective illustration showing the toner supply roller according to the present invention.

As illustrated in FIG. 3, the toner supply roller according to the present invention is constituted into a foamed elastic roller in which a roller 12 of a foamed elastic body is arranged around a metallic rotational shaft 11. In regard to the examples and comparative examples, image formation tests were carried out by arranging the aforesaid toner supply roller as a toner supply roller 5 of the printer as illustrated in FIG. 1. In the printer just mentioned, the distance between the shaft of the developing roller 6 and the shaft of the toner supply roller 5 was fixed to 13.5 mm. Accordingly, when a toner supply roller having an outside diameter of 13.0 mm is arranged against the developing roller having an outside diameter of 16.0 mm, the amount of the toner supply roller cutting in the developing roller becomes 1.0 mm (16.0/2+13.0/2−13.5).

Figure 4:
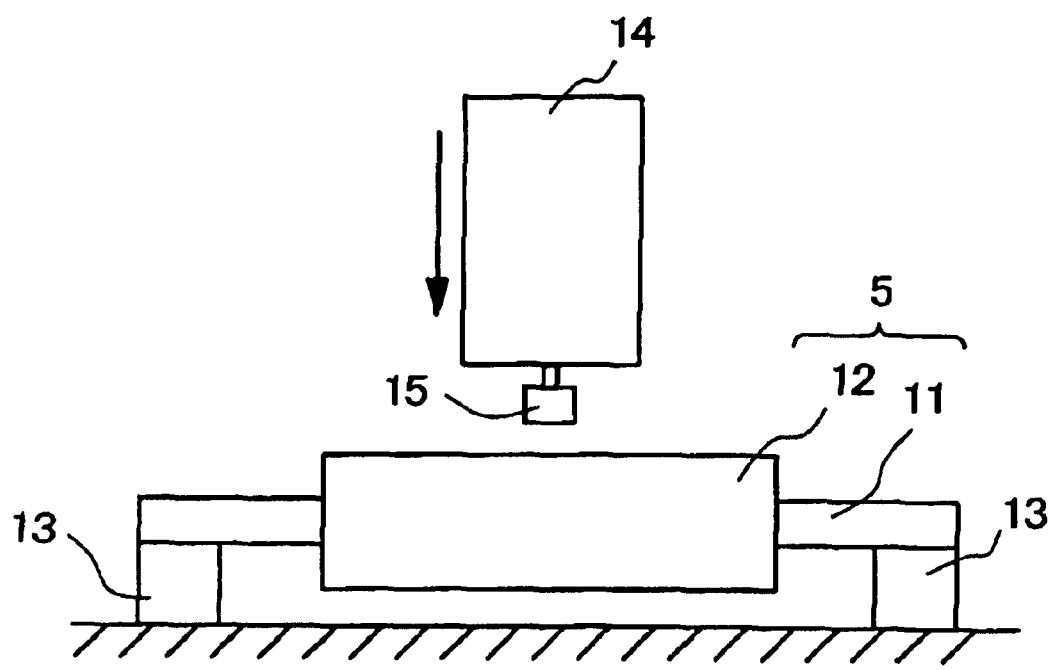
FIG. 4 is a schematic illustration showing a method for measuring the compression spring constant of the toner supply roller as indicated in working examples.

Moreover, by the measuring method as illustrated in FIG. 4, a measurement was made of the compression spring constant for the toner supply roller in both the peripheral and longitudinal directions thereof. As illustrated in FIG. 4, a rotational shaft 11 of a toner supply roller 5 was horizontally fixed with V blocks 13; a force gauge 14 arranged above a roller 12 was moved downwards at a constant velocity (0.1 mm/sec); a disc shaped compression jig (disc shaped penetrator) 15 with a diameter of 13 mm which was installed at the lower end of the force gauge 14 was pressed into the roller 12 to a depth of about 1.0 mm to obtain stress-strain diagram; and the compression spring constant was calculated therefrom. The measurement was made at an interval of 30 mm in the longitudinal direction of the roller and at an interval of 30 degrees in the peripheral direction thereof. Thus, the compression spring constant was obtained by averaging several measurement data.

In the present examples and comparative examples, the surface friction resistance of the roller was measured according to the method as illustrated in FIG. 5 by the use of a friction testing machine manufactured by Shintoh Scientific Co., Ltd under the trade name "HEIDON Tribogear".

The toner supply roller to be used in the present examples and comparative examples was subjected to the test for compression spring constant by the method as illustrated in FIG. 4, further to the test for friction resistance by the method as illustrated in FIG. 5 and thereafter to image formation tests by arranging the same as a toner supply roller 5 of a printer as illustrated in FIG. 1, wherein the developing roller A was placed as the developing roller 6.

The image evaluation and the image formation tests in the present examples and comparative examples were carried out under environmental conditions of constant temperature and constant humidity (25° C., 50% RH) by longitudinally feeding paper sheets of standard size of A-4 (210 mm/297 mm). Specifically, image evaluation was carried out by printing 10 sheets of deep gray sound images, followed by printing 1000 sheets of 7% gray sound images as a continuous image formation test. The results are given in Table 1.

In Table 1, the case of uniform and favorable image quality was marked with "○" and the case of non-uniform image quality with unevenness in depth was marked with "×". With regard to the defect of unprinted white images in a continuous image formation test, no occurrence thereof until the printing of 1000 sheets was marked with "no", and occurrence thereof within a period of printing of 1000 sheets was marked with "the number of printed sheets up to the occurrence".

TABLE 1

| Toner supply roller | | Compression spring constant (N/mm) | Cell diameter (µm) | No. of cells/ 25 mm | Friction resistance (N) | Defective white unprinted image | Images evaluation |
|---|---|---|---|---|---|---|---|
| Ex-6 | B | 0.7 | 180 | 95 | 0.7 | no | ○ |
| Ex-7 | C | 0.7 | 180 | 95 | 0.6 | no | ○ |
| Ex-8 | D | 0.7 | 180 | 95 | 0.5 | no | ○ |
| C/Ex-3 | E | 0.7 | 180 | 95 | 0.3 | no | X |
| C/Ex-4 | F | 0.7 | 180 | 95 | 1.4 | 750 | X |
| C/Ex-5 | G | 0.2 | 230 | 70 | 0.7 | no | X |
| C/Ex-6 | H | 6.0 | 120 | 140 | 0.7 | 500 | X |

{Remarks} Ex; Example, C/Ex; Comparative Example.
The compression spring constant is the average value of the values measured for all toner supply rollers. Friction resistance is the average value of three measured values for one of the toner supply rollers.

The following facts are understandable from the results as given in Table 1.

(1) The toner supply roller, when having a friction resistance exceeding 1.2 N, even if having a hardness (compression spring constant) in the range of 0,25 to 5.0 N/mm, leads to the occurrence of defective image such as unprinted white images that are attributable to the deterioration of a toner and beside low quality images such as unevenness in density.

(2) The toner supply roller, when having a friction resistance less than 0.4 N, even if having a hardness (compression spring constant) in the range of 0.25 to 5.0 N/mm, is free from the occurrence of defective image such as unprinted white images that are attributable to the deterioration of a toner, but leads to low quality images such as unevenness in density.

(3) The toner supply roller, when having a hardness (compression spring constant) less than 0.25 N/mm, even if having a friction resistance in the range of 0.4 to 1.2 N, is free from the occurrence of defective image such as unprinted white images that are attributable to the deterioration of a toner, but leads to low quality images such as unevenness in density.

(4) The toner supply roller, when having a hardness (compression spring constant) exceeding 5.0 N/mm, even if having a friction resistance in the range of 0.4 to 1.2 N, leads to the occurrence of defective image such as unprinted white images that are attributable to the deterioration of a toner and beside low quality images such as unevenness in density.

What is claimed is:

1. A toner supply roller which comprises (A) polyurethane foam obtained by agitationally mixing a urethane prepolymer, a foaming agent and a foam stabilizer, wherein said urethane prepolymer is synthesized from a polyol and a polyisocyanate in the presence of a modified silicone oil added thereto, or (B) polyurethane foam obtained by agitationally mixing a polyol, a polyisocyanate, a modified silicone oil, a foaming agent and a foam stabilizer, wherein said modified silicone oil is a modified silicone oil bearing a functional group reactive with a poly-isocyanate and said foam stabilizer is a foam stabilizer which comprises a polyether-modified silicone containing 50 to 100% by weight of a polyoxyethylene unit in the polyether moiety and said roller having the number of cells in the range of 50 to 200 per 25 mm length of the polyurethane foam and having a friction resistance of at most 1.0 N.

2. The toner supply roller according to claim 1, wherein the modified silicone oil is at least one species selected from the group consisting of alcohol-modified silicone oils, polyether-modified silicone oils and amino-modified silicone oils, and the amount of said modified silicone oil to be added is 0.1 to 5 parts by weight, based on 100 parts by weight of the prepolymer in the polyurethane foam (A) or 100 parts by weight of the polyol in the polyurethane foam (B).

3. The toner supply roller according to claim 1, wherein the modified silicone oil is a silicone oil modified at one terminal thereof.

4. The toner supply roller according to claim 1, wherein the modified silicone oil modified at one terminal thereof is bifunctional.

5. The toner supply roller according to claim 1, wherein the polyol is polyether polyol in whole or in part, and the ethylene oxide unit therein accounts for 5 to 80% by weight of all the polyol components.

6. Developing apparatus which is equipped with the toner supply roller as set forth in any of the preceding claims.

7. A toner supply roller constituted of a foamed elastic member mounted on a developing apparatus which comprises a toner cartridge that accommodates a toner as a developer, the toner supply roller and a developing roller, and which forms a toner image by supplying the toner to a static latent image on the surface of a photosensitive body, wherein the toner supply roller has a compression spring constant in the range of 0.25 to 5.0 N/mm and a surface friction resistance in the range of 0.4 to 1.2 N.

8. The toner supply roller according to claim 7, wherein the foamed elastic member has an average foamed cell diameter in the range of 20 to 400 µm and the number of cells per a length of 25 mm in the range of 50 to 200.

9. The toner supply roller according to claim 7, wherein the foamed elastic member has an average foamed cell diameter in the range of 100 to 300 µm, the number of cells per a length of 25 mm in the range of 10 to 100 and a compression spring constant in the range of 0.4 to 4.0 N/mm.

10. The toner supply roller according to claim 7, which comprises a highly electroconductive shaft and an electroconductive foamed elastic layer formed on the outside thereof.

11. The toner supply roller according to claim 10, wherein the highly electroconductive shaft is a metallic shaft, and the electroconductive foamed elastic layer is imparted with electroconductivity by means of electroconductive carbon.

* * * * *